United States Patent [19]

Case et al.

[11] 4,072,990
[45] Feb. 7, 1978

[54] SERVO POSITIONING SYSTEM FOR DATA STORAGE APPARATUS

[75] Inventors: William John Philip Case, Winchester; Robert Duncan Commander, Eastleigh, both of England

[73] Assignee: International Business Machines Corporation, Armonk, N.Y.

[21] Appl. No.: 706,313

[22] Filed: July 19, 1976

[30] Foreign Application Priority Data

July 24, 1975 United Kingdom ............... 30922/75

[51] Int. Cl.² ........................ G11B 5/56; G11B 21/10; G11B 17/00
[52] U.S. Cl. ....................................... 360/77; 360/78; 360/98
[58] Field of Search ................................... 360/77–78, 360/135, 133, 137; 346/137; 318/653

[56] References Cited

U.S. PATENT DOCUMENTS

| | | | |
|---|---|---|---|
| 3,156,906 | 11/1964 | Cummins | 360/78 |
| 3,479,664 | 11/1969 | Stuart-Williams et al. | 360/77 |
| 3,593,331 | 7/1971 | Connel et al. | 360/77 |
| 3,593,333 | 7/1971 | Oswald | 360/77 |
| 3,656,130 | 4/1972 | Bucklin, Jr. et al. | 360/78 |
| 3,812,533 | 5/1974 | Kimura et al. | 360/78 |
| 3,864,741 | 2/1975 | Schwarz | 360/77 |
| 3,947,881 | 3/1976 | Dahill et al. | 360/78 |
| 3,994,016 | 11/1976 | Moghadam | 360/77 |

OTHER PUBLICATIONS

IBM Technical Disclosure Bulletin, vol, 10, No. 6, Disc Surface Digital Addressing, C. R. Wilford et al., Nov. 1967, p. 783.
IBM Tech. Disc. Bull., vol. 16, No. 7, Track Servo System, L. F. Shew, Dec. 1973, pp. 2225–2226.
IBM Tech. Disc. Bull., vol. 15, No. 3, Discrete Magnetic Recording System, L. F. Shew, Aug. 1972, pp. 752–753.
IBM Tech. Disc. Bull., vol. 17, No. 6, Correction of Data Track Misregistration in Servo Controled Disc. Files, A. Paton, Nov. 1974, pp. 1781–1783.

*Primary Examiner*—Alfred H. Eddleman
*Attorney, Agent, or Firm*—R. E. Cummins; R. D. Moss

[57] ABSTRACT

Data track positioning information for data tracks on a stack of recording disks is provided by servo information pre-recorded on one surface of the stack. In addition, each data track on the remaining surfaces of the stack has servo information relative to that track pre-recorded in sectors around the track. Track following operations are controlled in a closed loop servo system using on-track position information derived from the sectored servo tracks associated with the track being followed. The bandwidth of the position error signal derived from the sectored servo information is increased by adding high frequency components obtained from the continuous servo information on the servo surface. Track access operations are controlled using track crossing information derived from the pre-recorded servo information on the servo surface.

4 Claims, 7 Drawing Figures

SERVO POSITIONING SYSTEM FOR DATA STORAGE APPARATUS

BACKGROUND OF THE INVENTION

1. Field of the Invention

The invention relates data storage apparatus and particularly to a servo positioning system therefor.

2. Description of the Prior Art

In data storage apparatus of the type using a stack of rotating disks as the record medium, data is usually recorded in a plurality of concentric data tracks on the surfaces of the disks. The tracks are closely spaced for example at 300 tracks per inch and the data recorded at densities in excess of 5000 bits per inch. In order to access the recorded data, it is necessary to move a record and playback head (or transducer) to the selected track in which the desired information is stored and maintain the head precisely over the centre of the track with a minimum displacement error in the presence of any possible disturbance for the whole time the information is being read or updated. These two functions may be achieved for example by a head positioning servo system such as that described and claimed in co-pending application Ser. No. 681,656 to Commander el al., filed Apr. 29, 1976 data and assigned in common with the present application.

In the system described in co-pending application Ser. No. 681,656, track positioning information is derived from a read only servo head associated with a pre-recorded servo disk included in the stack of disks. Data recording and playback heads ganged for movement with the servo head are associated with data disks which form the remainder of the stack. Associated servo electronic circuits produce a position error signal indicating the radial position of the dat heads relative to the desired data track on the data disks.

Such prior art systems involving a dedicated servo head and a dedicated servo disk, where the data heads were mounted for movement with the servo head, operate on the assumption that any factors which effected a relative change of the absolute position of a servo track or servo head, will result in a substantially corresponding change to the absolute position of the data track or data head. However, it has been found that as track densities increase, this assumption is no longer valid in that certain low frequency disturbances (typically of less that 100 Hz), either singly or in combination, may affect the data head-data track relationship to a different degree than they affect the servo head-servo track relationship such that a differential exists which may vary at some undetermined variable rate. Since the ability of a data head to recover data reliably requires that it should not be off track by more than 10% of its normal width, off track errors of say 0.0005 inches which are tolerable at track densities of 200 tracks per inch are unacceptable at 500 tracks per inch.

It has been found that low frequency disturbances which may result in such a differential response may be produced by a variety of causes. For example, the differential thermal expansion effects between servo head and servo disk and between data head and data disk produced by a change in ambient temperature are found not to be the same. Thus, compensatory movement of the servo head and disk in response to expansion effects does not produce the correct compensatory movement of the data head and disk, resulting in an off-track condition. Other low frequency differential effects may be produced by slight eccentricity or tilt of the disks on the spindle. Transient low frequency vibrations caused by the head actuator may also create bending modes of vibration in the spindle.

An alternative approach which avoids these disadvantages is to dispense with the servo disk altogether and to provide servo position information on each data disk in sectors alternating with sectors of data. This enables the servo position information to always be derived from the disk being accessed and consequently the low frequency disturbances referred to above have no effect. Systems using sectored servo information are described in, for example, U.S. Pat. No. 3,185,972 to Sippel, U.S. Pat. No. 3,593,333 to Oswald and U.S. Pat. No. 3,864,741 to Schwarz. Sectored servo systems themselves suffer however from another disadvantage, namely that the resulting position error signal is limited in bandwidth by the frequency of occurrence of the servo sectors (typically of the order of 2 KHz for a 60 sector disk rotating at 2000 RPM.)

In order to have a closed loop system with sufficient gain at low frequencies to correct position offsets caused by the above mentioned disturbances and also to enable the head to settle on track at the end of an access motion within an acceptable time a relatively high bandwidth of several hundred Hz is required. At the same time, with a sampled system it is essential that the gain of the system be reduced to zero before the sampling frequency 2 KHz is reached. Such a reduction in gain at 2 KHz also has a significant impact on gain and more particularly phase lag at frequencies as low as 300 Hz. Increased phase lag results in a longer settling time and insufficiently quick response to disturbances.

Conventional attempts to increase phase lag compensation have the side effect of increasing high frequency gain and the system may become unstable at frequencies around 1000 Hz because of mechanical resonance problems.

SUMMARY OF THE INVENTION

Accordingly it is an object of the present invention to provide a new and improved sector servo positioning system for positioning a data transducer in relation to data bearing disks in a data storage apparatus.

It is also an object of the invention to provide a more accurate and higher bandwidth position error signal for use in a sector servo positioning system employed to position a transducer over a data track in magnetic disk data storage apparatus.

These and other objects of the invention are achieved by the combination of a sector servo system providing accurate low frequency position information about the position of a data transducer over a data track with an auxiliary position reference system providing continuous higher bandwidth position information. The sector servo system comprises a plurality of position reference sectors interleaved with data on the surface of a data bearing disk. A first position error signal is derived from signals read by the data head from the servo sectors. The auxiliary position reference system preferably comprises a dedicated servo disk, rotatable with said data bearing disk and a servo transducer movable in conjunction with the data transducer. The auxiliary system provides a substantially continuous second position error signal, higher frequency portions of which are combined with lower frequency portions of the first position error signal to provide a hybrid position error signal of higher bandwidth than said first position error signal alone.

BRIEF DESCRIPTION OF THE DRAWINGS

In order that the invention may be fully understood, a preferred embodiment thereof will now be described with reference to the accompanying drawings.

In the drawings:

FIG. 4 a to c show various waveforms required to control the operation of the phase locked oscillator included in the servo control circuits of FIG. 3;

FIG. 4 d to h show various output waveforms of the phase locked oscillator included in the servo control circuit of FIG. 3;

FIG. 4 i to j show waveforms generated by the missing clock circuit forming part of the servo control circuit of FIG. 3;

FIG. 5 shows details of the missing clock circuit producing the missing clock pulses shown in the waveform of FIG. 4j;

Although as previously explained, data head positioning can be achieved under control of information derived solely from the sectored servo information on the disk surface, in the preferred embodiment now to be described, the bandwidth of the position information is increased by adding the high frequency components of the signal from the dedicated servo surface to the sectored servo signal from the data surface. This is illustrated schematically in FIG. 1 of the accompanying drawings.

Figure 1:
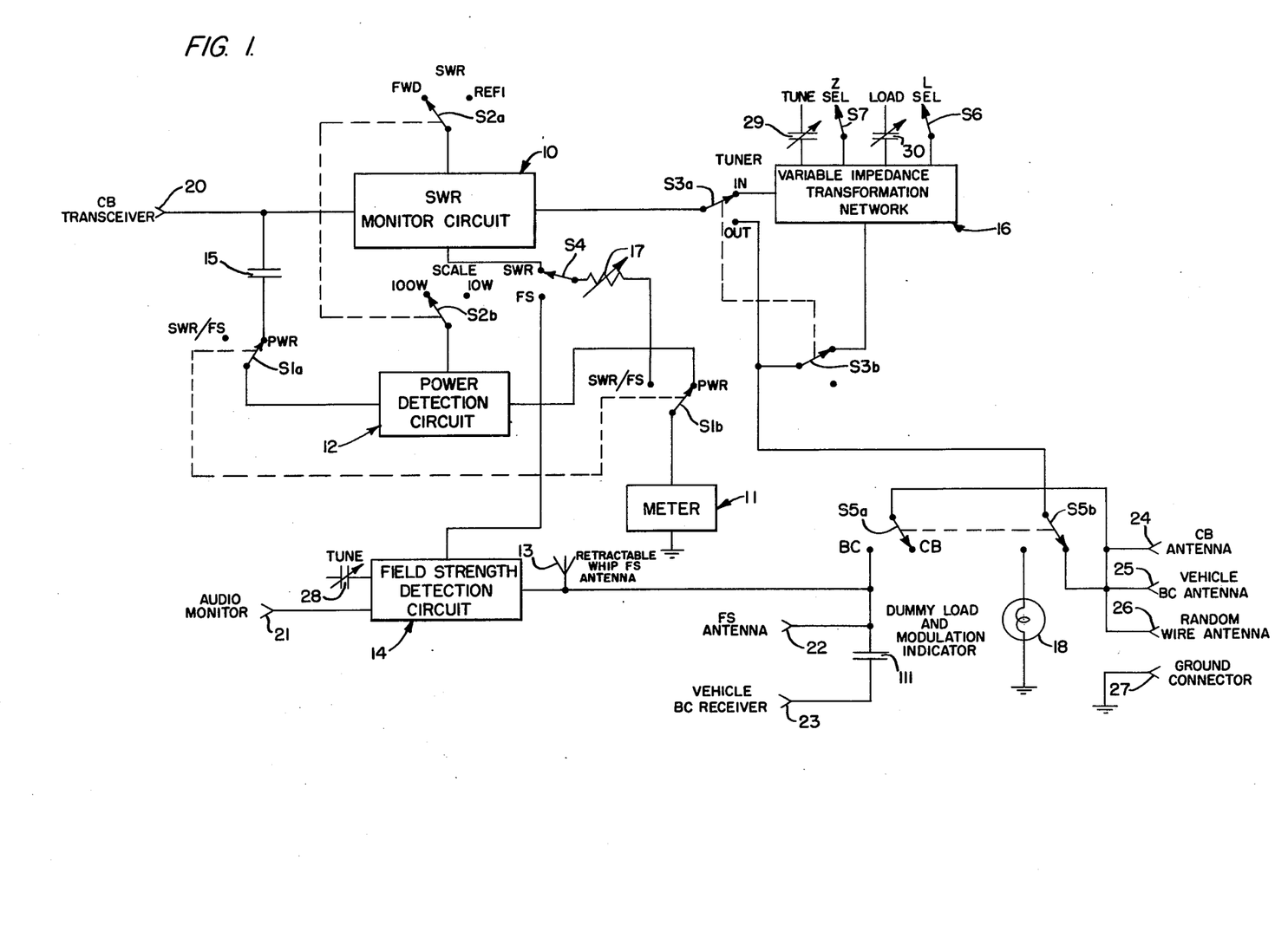
FIG. 1 illustrates schematically the production of a data head position error signal according to one aspect of the invention.

The sampled position error signal derived from the sectored servo information read by the data head is supplied on terminal 1 and passed through low pass filter 2. This signal contains the low frequency information regarding the position of the data head with respect to the true on-track position of the track being assessed. Although in the preferred embodiment there are sixty-five servo sectors on each data track, this sampling rate may not be high enough to produce a position error signal of sufficient bandwidth to close the servo loop without introducing a significant phase lag. Accordingly, high frequency components from a continuous position error signal derived by the servo head from the dedicated servo surface are added to the sectored servo position error. The dedicated servo position error signal is therefore supplied to terminal 3 and passed through a high pass filter 4. The low frequency position information from the dedicated surface, which may well be affected by low frequency variations such as described previously, are thereby removed. The two filtered signals are combined in mixer circuit 5 and a wide bandwidth position error signal representing the true position error of the data head with respect to the track being read is supplied to output terminal 6.

Figure 2:
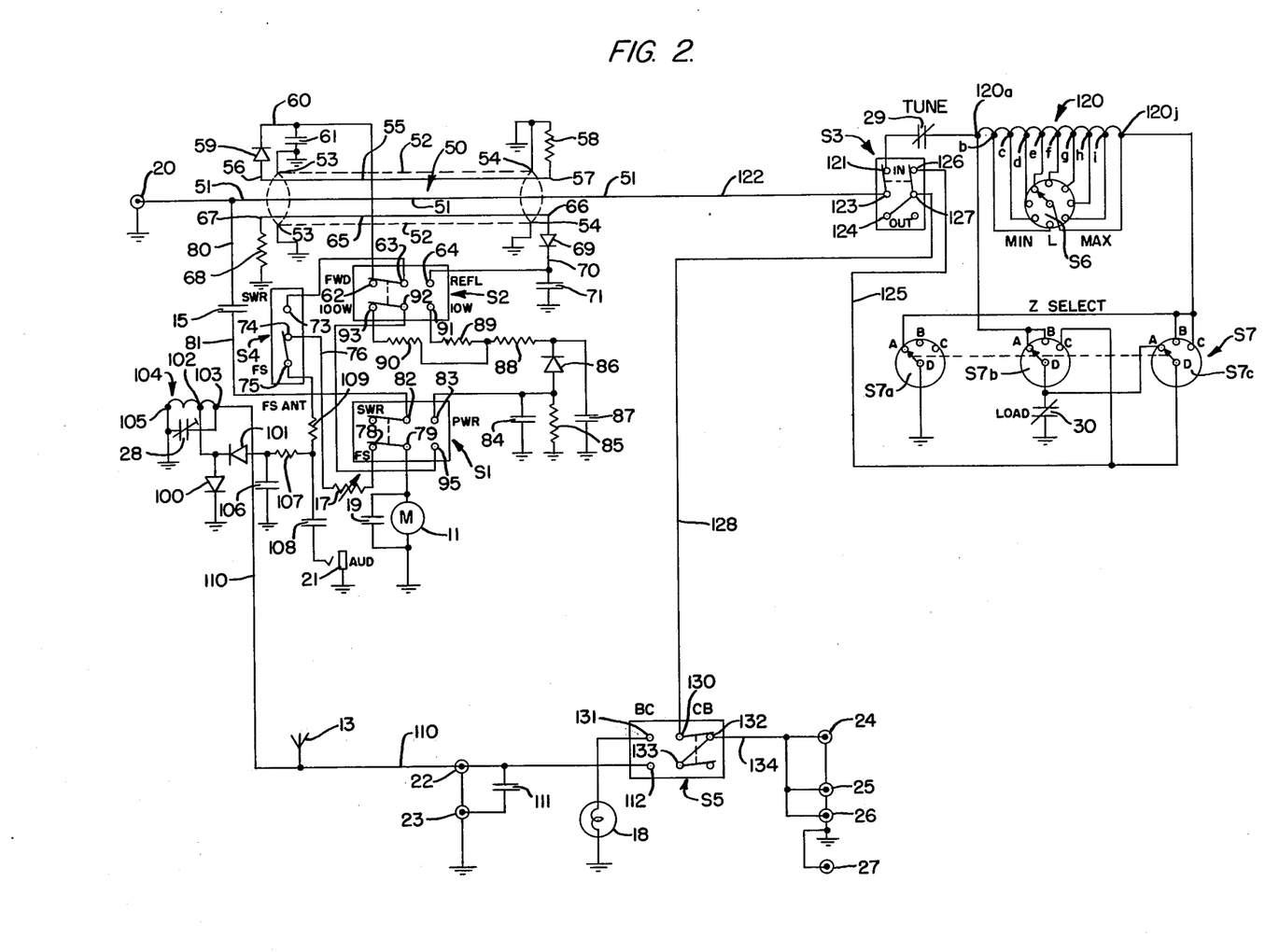
FIG. 2 shows in block form data storage apparatus incorporating the present invention.

The block diagram of the storage apparatus is shown in FIG. 2. A stack of magnetic recording disks 7 are mounted for rotation on a central spindle 8. Pre-recorded servo tracks 9 are provided over one surface of one of the disks, in this case the lowest disk in the stack and are read by an associated read-only servo head 10. Since this surface contains only servo information, it is referred to as a dedicated servo surface. The dedicated servo surface contains the information regarding the position of data tracks on the remaining surface of the disks which are accessed by a number of data recording and playback heads 11, one being provided for each of the remaining disk surfaces. The data heads 11 and the servo head 10 are all ganged together for movement to and fro over the disk surfaces by actuator mechanism 12.

The continuous position error signal derived by the servo head 10 reading the pre-recorded servo information 9 on the dedicated servo surface is used alone to provide positioning information during track accessing operations. This positioning information takes the form of track crossing pulses derived from the error signal by the servo control circuits 15 after being passed through conventional preamplifier 13 and AGC amplifier 14. The address of the destination track is supplied to the control circuits 15 from an external control system 16 and from this information the servo control circuits produce the necessary drive currents for the actuator mechanism 12 so that the data heads are moved to the desired destination track following a predetermined velocity profile.

The actual servo circuitry used for controlling track access in apparatus of the preferred embodiment is fully described in the aforesaid co-pending application Ser. No. 681,656. It will be realised however that there are many alternative arrangements for controlling track access operations which could be used in place of that described. Although the encoded servo pattern used is the so-called tri-bit pattern described in the aforesaid co-pendng application, it will be realised that there are many alternative ways of encoding the servo information 9 which may be used to equal advantage. The operation and nature of the servo circuits during a track access operation, and a suitable description of the tri-bit servo pattern actually used are provided in the aforesaid co-pending application Ser. No. 681,656.

During track following operations the position error signal required to maintain the data head accurately on track is derived primarily from the servo information pre-recorded in sectors around the data track itself. The "on-track" position is when the servo head lis centrally displaced about two pre-recorded servo tracks. If the head is off-track an error signal is developed which after suitable processing is used to control drive current to the actuator mechanism 12 and thus form a closed loop track following system.

As in the case of the servo pattern on the dedicated surface, the precise nature of the servo encoded pattern used to write the sectored servo tracks has no special bearing on the invention. Any method of encoding which produces an error signal indicating by its magnitude and polarity the degree and direction of off-set from the true on track position can be used. There are of course many suitable alternatives described in the prior art and therefore it is not necessary for a description of the encoding of the sectored servo information to be included in this specification.

Data and servo information read by a selected data head 11 is passed through conventional pre-amplifier 17 and the AGC amplifier 18. The selection of the data head may be by any of the known conventional head selection methods. The servo information pre-recorded in sixty-five equally spaced sectors around the data track is gated to the servo control circuits 15, under control of a servo protect signal the production of which will be described later.

The d.c. and low frequency information of the sectored servo information is combined with the high frequency information derived from the dedicated servo surface in the servo control circuits 15. The resulting combined signal of wide bandwidth is then used to produce suitable drive currents to control the actuator mechanism 12 in a known manner. The signals from the AGC amplifier 18 are also passed along data channel 51 to the control system 16 so that the data recorded between sectors can be processed in the usual way. The occurrence of the data part of the signal from the data head is indicated by the down level of the servo protect signal as will be apparent when the production of this signal is described later. The head selection circuits and other features of the data channel have no special bearing on the present invention and are not described in this specification.

Details of the servo circuits for producing the data head position error signal will now be given with reference to the block diagram of FIG. 3. One function of the servo control circuit is to sample the data signals at the appropriate times to extract the sectored servo information. The location of the start of each servo sector on the data tracks is indicated by servo address marks written in associated locations around corresponding servo tracks on the dedicated servo surface. As will be apparent, these address marks can take any of many forms depending on how the servo information is encoded. Since in this apparatus the servo encoding used is the modified tri-bit pattern described in and claimed in the co-pending application Ser. No. 681,656, it has been found convenient to represent a servo address mark by a predetermined pattern of missing clock pulses from the otherwise continuous stream produced by the tri-bits on the dedicated surface. The detection of the appropriate pattern of missing clock pulses representing a servo address mark indicates that an associated sector of servo information is about to be presented to each data head.

The servo information from servo head 10 is supplied from AGC amplifier 14 to the input of position error detection circuits 20. These circuits produce clock pulses on line 21 to phase locked oscillator (PLO) 22 in response to the clock information derived from the tri-bit patterns pre-recorded in the servo tracks. In turn, the PLO 22 produces control timing pulses on line 23 for detection circuit 20. The detection circuit demodulates the position signals from the tri-bits and produces a position error signal on output line 24. A full description of the position error detect circuit used in the apparatus is to be found in the co-pending application Ser. No. 681,656, where it is particularly described with reference to FIG. 6 of the specification. Accordingly, the description of this part of the apparatus will not be repeated in this specification.

The construction and operation of the PLO 22 is also described in detail in said co-pending application with particular reference to the block diagram of FIG. 11 and the waveforms of FIG. 12. An additional function of the PLO 22 required for this particular invention which is not described in the co-pending application is a logic arrangement for producing a "missing clock" pulse each time an actual clock pulse is missing from the normally continuous stream of pulses derived from the dedicated servo surface. Thus, a pattern of missing clock pulses are emitted from this logic each time a servo address mark is read by the servo head.

The signal waveforms associated with the PLO shown in FIG. 12 of said co-pending application Ser. No. 681,656 have been reproduced for the convenience in this application as FIGS. 4a to 4h. Reference to said co-pending application will show that waveform (a) is the servo clock input to the PLO, waveform (b) is the output from a single-shot triggered by the servo clocks, waveform (c) is the output from a clock latch and waveform (d) (e) (f) (g) and (h) are outputs from PLO counters CT1, CT2, CT3 and CT4, and CT5 respectively used to demodulate the position error signals in the position detect circuit 20. The three of the signal waveforms used by the missing clock logic are waveforms (b), the output from the PLO single shot, waveform (f) the output from the PLO counter 3 (CT3), and waveform (g) the output from PLO counter 4 (CT4). The servo clock waveform (a) has been drawn with a clock pulse omitted to make the operation of the missing clock detection logic quite clear. Consequently, the associated single shot pulse is also missing. An additional waveform (i) has been added to show the signal level out of part of the "missing clock" detect logic and waveform (j) shows the generation of the actual "missing clock" pulse produced as output from the detect logic.

The missing clock logic itself is shown in FIG. 5 and consists of a conventional edge triggered J/K flip-flop 25 responsive to positive edges. This flip-flop is followed by a conventional AND-gate 26.

Figure 4:
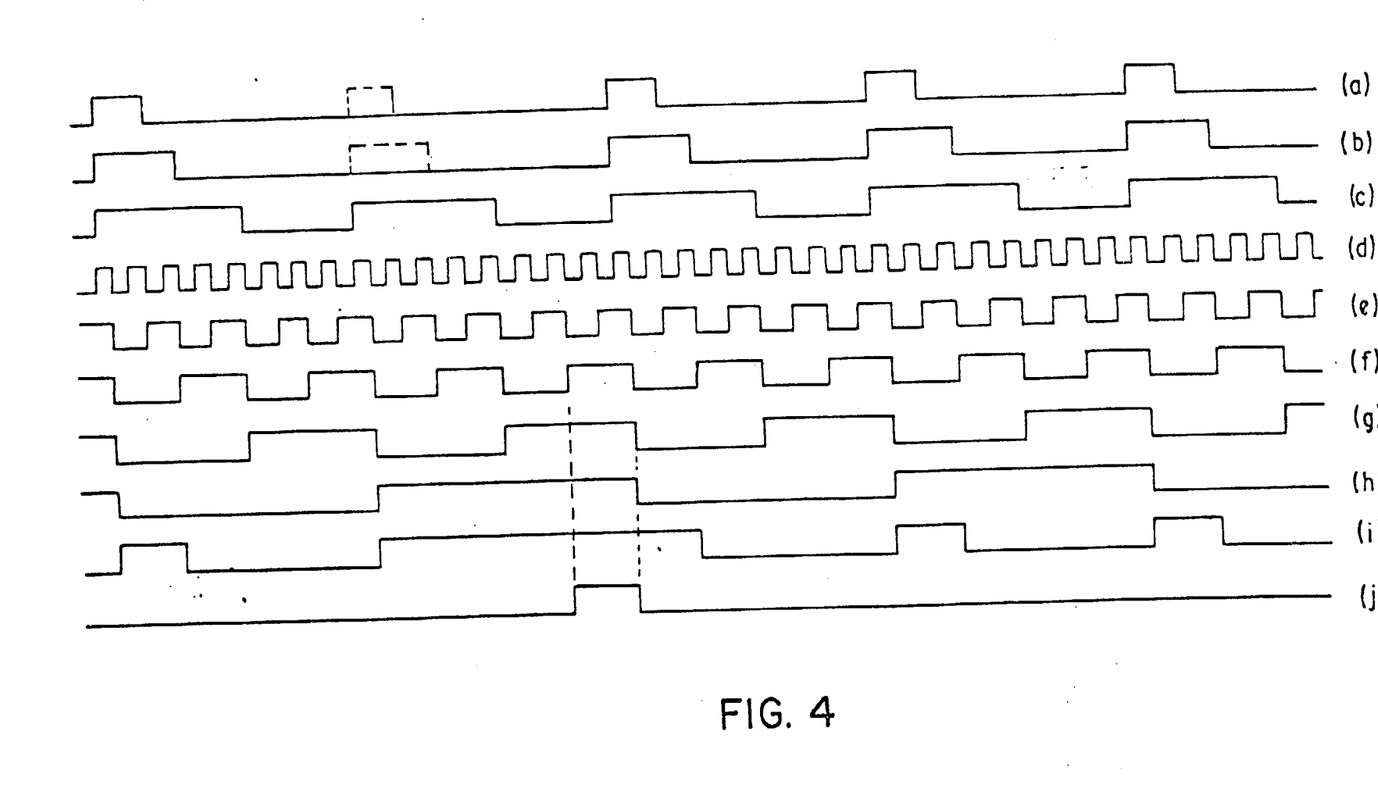

The input to the J set terminal 50 and the latch is CT4 waveform, thus whenever the CT4 waveform (g) goes negative, latch 25 is set. Its output is shown in waveform (i) of FIG. 4. The input to the K reset terminal 51 is the inverted single-shot waveform. Thus, whenever the single-shot waveform (b) goes negative, latch 25 is reset. In the case of a missing clock pulse such as shown at the next clock interval in waveform (a), the single-shot is not triggered and consequently the latch 25, having been set by the CT3 output is not reset and remains at an up-level as shown in waveform (i). The Q output from the latch is applied as one input to three input AND-gate 26, the other two inputs are the CT3 and CT4 signals shown in waveforms (f) and (g) respectively. Consequently shortly after the occurrence of a missing clock the input conditions for AND-gate 26 will be met and its output will go positive until the CT3 and CT4 outputs drop. This up-level from AND-gate 26 on line 28 is the pulse indicating that a clock pulse was missing from the normally continuous stream of clocks from the dedicated servo surface.

Figure 3:
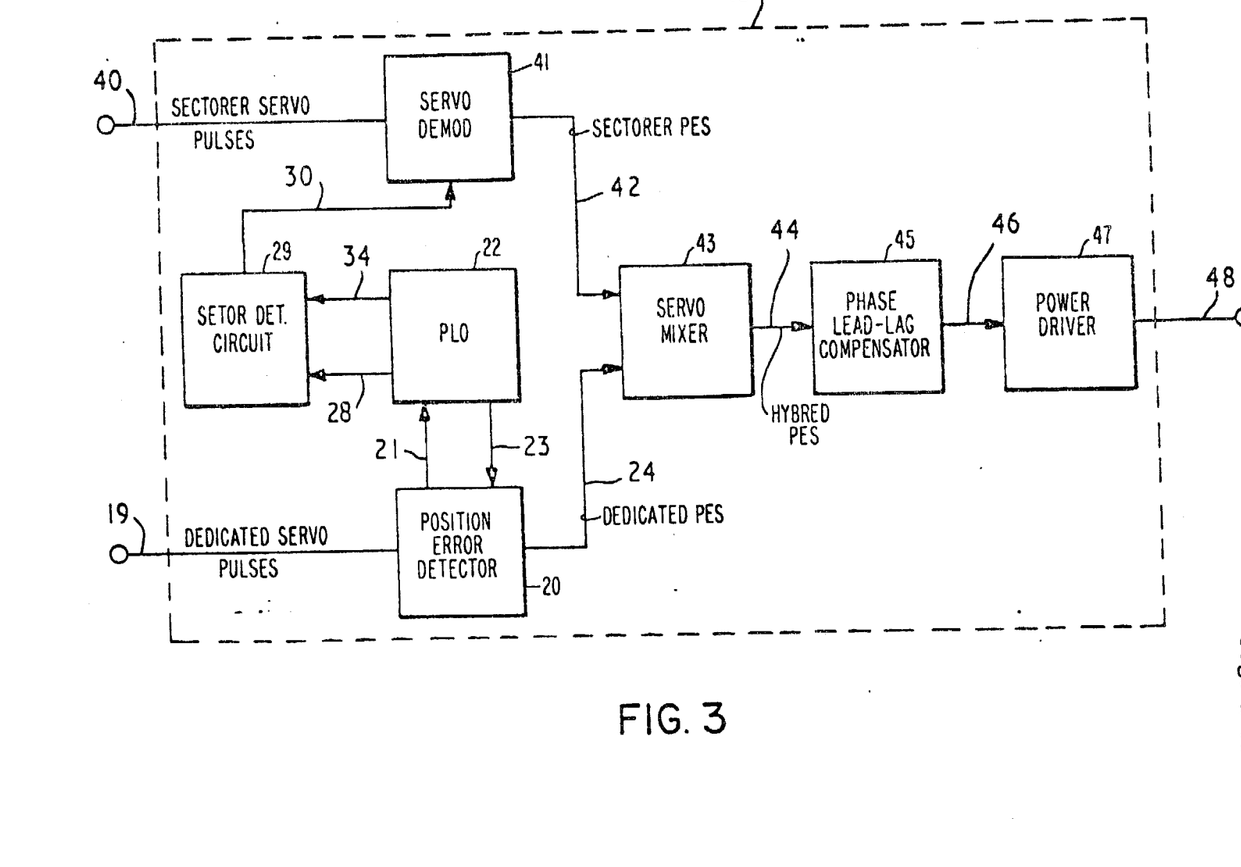
FIG. 3 shows details of the servo control circuits included in the storage apparatus shown in FIG. 2.

The "missing clock" output line 28 from the PLO 22 is shown supplied as input to sector detect circuit 29 in FIG. 3 of the drawings of the present specification. Thus, whenever a servo address mark is read from the dedicated servo surface, a corresponding pattern of missing clock pulses is produced from the "missing clock" logic on missing clock line 28 to the sector detect circuit 29. The purpose of the sector detect circuit 29 is to detect the servo address mark pattern and to produce the "servo protect" signal previously referred to on its output line 30. The arrangement is used such that the servo protect signal lasts for the duration of the following associated sector of servo information occurring in corresponding data tracks on the data surface.

Figure 6:
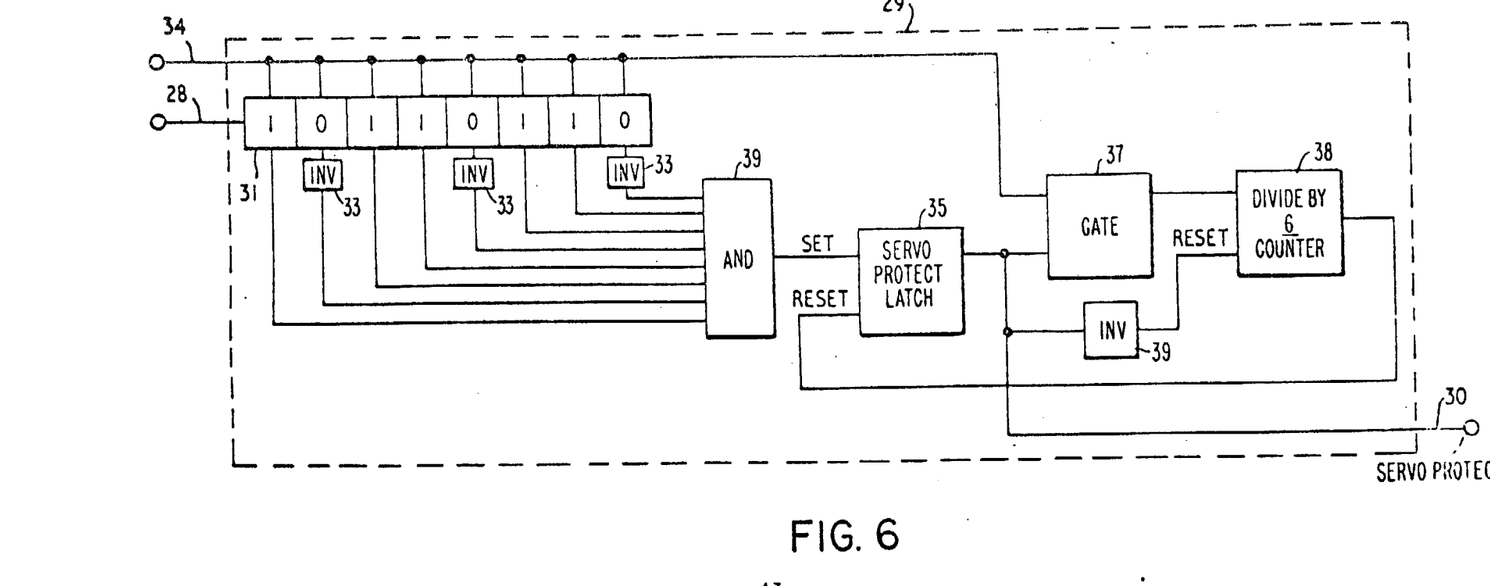
FIG. 6 shows details of the servo sector detect circuit included in the servo control circuits of FIG. 3.

The sector detect circuit 29 is shown in FIG. 6 and consists of a shift register 31 having as many stages as there are bits in the servo address mark to be recognized. The address mark in this example is represented by the pattern 10110110 of "missng clock" bits. "Missing clock" bits are, of course, the inverse of the actual clocks omitted from the original stream from the disk. Shift register 31 has eight stages all connected for parallel read out to positive AND-gate 32. Inverters 33 are supplied in the outputs from the second, fifth and last stage of the shift register so that the input conditions for AND-gate 32 will be met only when the actual eight bits of the servo address mark is contained in the eight stages of shift register 31. The clocking input for shift register 31 is the output of PLO counter 4 (CT4) supplied on line 34 from PLO 22. The CT4 output signal is shown as waveform (g) in FIG. 4 and serves to shift the missing clock pulses through shift register at the clock rate. As soon as the servo address mark is detected, the positive pulse transmitted by AND-gate 32 sets conventional latch 35. The output from this latch on line 30 is previously referred to "servo protect" signal and accordingly is required to reamin at its up-level for the duration of the associated sector of servo information from the data disk.

Each sector of servo information is twelve bytes (six servo cells) in length. The servo protect signal from latch 35 is therefore connected as one input to AND-gate 37 is having the output from PLO counter 4 (CT4) on line 34 supplied as the other input. The output from the AND-gate 37 is supplied to divide-by-six counter 38 the output of which is used to reset the latch 35. By this means, the servo protect signal is terminated at the required time. The servo protect signal from latch 35 is passed through inverter 39 and used to reset counter 38.

The servo protect signal on line 30 (FIG. 3) is used in a conventional manner to gate the sectors of servo information from data surfaces on data input line 40 to demodulator circuits 41. The nature of the demodulator circuits again depends on the particular servo encoding used to store the sectors of servo information. As with the dedicated surface, any one of many alternative demodulation systems which produce a data head position error signal indicating the magnitude and direction of the off-set from the true on-track position may be used. In view of the fact that such systems are well known in the art, the description of the modulation of the sectored servo information will not be given here. As may not be the case with position error signals derived from the dedicated servo surface, the position error signal supplied from demodulator output line 42 is correct for the data track being accessed. The position error signal on line 24 derived from the dedicated servo surface may be subject to the influence of low frequency variations as previously described and may not be correct for the track being accessed. The high frequency components of this dedicated servo signal are used, however, to increase the bandwidth of the position error signal derived from the data track.

The combination of the d.c. and low frequency components of the sectored servo position error signal with the high frequency components of the dedicated servo position error signal takes place in servo mixer 43. The resultant so-called hybrid servo position error signal on output line 44 is compensated in the usual way by conventional phase lead/lag compensator 45 and the phase compensated error signal on line 46 is supplied to conventional driver circuit 47. This in turn produces drive current on drive line 48 of appropriate magnitude and polarity to energise the actuator mechanism 12 (FIG. 2) to close the servo loop in the usual way.

Figure 7:
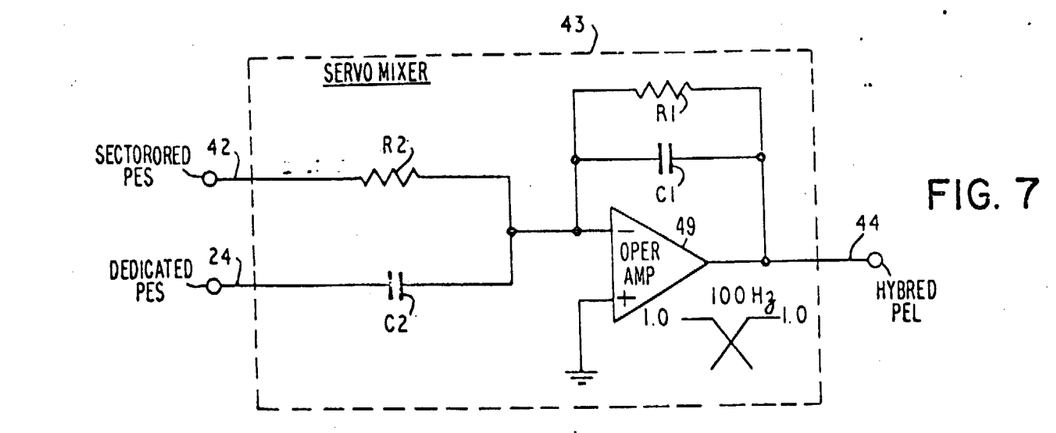
FIG. 7 shows details of the servo mixer circuit included in the servo control circuits of FIG. 3.

The servo mixer circuit 43 is shown in FIG. 7 of the drawings. The circuit consists of a conventional operational amplifier 49 having a parallel combination of resistor $R_1$ and capacitor $C_1$ in its feedback path. The sector position error signal on input line 42 is applied to the inverting input of the amplifier through resistor $R_2$.

The dedicated position error signal on input line 24 is applied to the same input of the amplifier but through capacitor $C_2$ instead of resistor $R_2$. The other amplifier input is connected to ground. Inspection of this circuit shows that it acts as a low pass filter for the sectored position error signal on input 42 and as a high pass filter for the dedicated signal on input 24. The component values of the circuit are such that the cross-over frequency occurs at 100 Hz. The combined or hybrid position error signal appears at the output line 44 of the mixer and is used to close the servo loop as previously briefly described.

What is claimed is:

1. In a servo positioning system for maintaining a data transducer centered on a selected one of a plurality of concentric data tracks on an information bearing disk rotatable in a disk file, said data tracks including interleaved servo position reference sectors and data sectors,
   sampling means for sampling signals from said data transducer at times corresponding to said servo sectors;
   means connected to said sampling means and responsive to said sampled signals to generate a first position error signal indicating deviations of said data transducer from said data track center, said first position error signal being limited in bandwidth by the frequency of occurrence of said servo sectors;
   a servo disk, rotatable coaxially with said information bearing disk, and having continuous servo position reference information recorded thereon in a plurality of concentric servo tracks corresponding to said data tracks;
   a servo transducer, movable conjointly with said data transducer, for sensing said servo information on said servo tracks as said servo disk rotates; and
   means connected to said servo transducer and responsive to said sensed servo information signals to generate a second position error signal indicating deviations of said servo transducer from said servo tracks, said deviations corresponding nominally to said deviations of said data transducer from said data tracks but being subject to low frequency differential effects which reduce the accuracy of said second position error signal, the improvement comprising;
   means connected to both said position error signal generating means for combining low frequency components only of said first position error signal with high frequency components only of said second position error signal to provide a hybrid position error signal of increased bandwidth over said first position error signal and of greater accuracy than said second position error signal, and
   actuator means for moving said data and servo transducers, said actuator means being connecting to receive said hybrid position error signal and being responsive thereto to maintain said data transducer centered over said selected data track.

2. A system according to claim 1 wherein said combining means comprises:
    low pass filter means for extracting said low frequency components of said first position error signal,
    high pass filter means for extracting said high frequency components of said second position error signal, and
    summing means for summing said filtered components to provide said hybrid position error signal.

3. A system according to claim 2 wherein said high pass filter means passes components having frequencies greater than 100 Hz and low pass filter means passes components having frequencies less than 100 Hz.

4. A system according to claim 1 wherein said servo position reference information in said servo tracks is modulated to include servo sector indicating information at a plurality of circumferentially spaced locations, and
    wherein said sampling means is responsive to the occurrence of said sector indicating information to sample signals from said data transducer for a predetermined time.

* * * * *

UNITED STATES PATENT OFFICE
CERTIFICATE OF CORRECTION

Patent No. 4,072,990                    Dated February 7, 1978

Inventor(s) William John Philip Case, et al

It is certified that error appears in the above-identified patent and that said Letters Patent are hereby corrected as shown below:

The Title page and the two sheets of Drawings should be deleted and substituted with the attached therefor.

Signed and Sealed this

Seventh Day of November 1978

[SEAL]

Attest:

RUTH C. MASON
Attesting Officer

DONALD W. BANNER
Commissioner of Patents and Trademarks

United States Patent

Case et al.

[11] 4,072,990
[45] Feb. 7, 1978

[54] SERVO POSITIONING SYSTEM FOR DATA STORAGE APPARATUS

[75] Inventors: William John Philip Case, Winchester; Robert Duncan Commander, Eastleigh, both of England

[73] Assignee: International Business Machines Corporation, Armonk, N.Y.

[21] Appl. No.: 706,313

[22] Filed: July 19, 1976

[30] Foreign Application Priority Data

July 24, 1975 United Kingdom ............ 30922/75

[51] Int. Cl.² ............ G11B 5/56; G11B 21/10; G11B 17/00
[52] U.S. Cl. ............ 360/77; 360/78; 360/98
[58] Field of Search ............ 360/77–78, 360/135, 133, 137; 346/137; 318/653

[56] References Cited

U.S. PATENT DOCUMENTS

| | | |
|---|---|---|
| 3,156,906 | 11/1964 | Cummins .......... 360/78 |
| 3,479,664 | 11/1969 | Stuart-Williams et al. .......... 360/77 |
| 3,593,331 | 7/1971 | Connel et al. .......... 360/77 |
| 3,593,333 | 7/1971 | Oswald .......... 360/77 |
| 3,656,130 | 4/1972 | Bucklin, Jr. et al. .......... 360/78 |
| 3,812,533 | 5/1974 | Kimura et al. .......... 360/78 |
| 3,864,741 | 2/1975 | Schwarz .......... 360/77 |
| 3,947,881 | 3/1976 | Dahill et al. .......... 360/78 |
| 3,994,016 | 11/1976 | Moghadam .......... 360/77 |

OTHER PUBLICATIONS

IBM Technical Disclosure Bulletin, vol. 10, No. 6, Disc Surface Digital Addressing, C. R. Wilford et al., Nov. 1967, p. 783.
IBM Tech. Disc. Bull., vol. 16, No. 7, Track Servo System, L. F. Shew, Dec. 1973, pp. 2225–2226.
IBM Tech. Disc. Bull., vol. 15, No. 3, Discrete Magnetic Recording System, L. F. Shew, Aug. 1972, pp. 752–753.
IBM Tech. Disc. Bull., vol. 17, No. 6, Correction of Data Track Misregistration in Servo Controled Disc Files, A. Paton, Nov. 1974, pp. 1781–1783.

Primary Examiner—Alfred H. Eddleman
Attorney, Agent, or Firm—R. E. Cummins; R. D. Moss

[57] ABSTRACT

Data track positioning information for data tracks on a stack of recording disks is provided by servo information pre-recorded on one surface of the stack. In addition, each data track on the remaining surfaces of the stack has servo information relative to that track pre-recorded in sectors around the track. Track following operations are controlled in a closed loop servo system using on-track position information derived from the sectored servo tracks associated with the track being followed. The bandwidth of the position error signal derived from the sectored servo information is increased by adding high frequency components obtained from the continuous servo information on the servo surface. Track access operations are controlled using track crossing information derived from the pre-recorded servo information on the servo surface.

4 Claims, 7 Drawing Figures